April 10, 1928. 1,665,662
C. E. GODKIN
ELECTROMAGNETIC DETECTING DEVICE
Filed Dec. 15, 1925 2 Sheets-Sheet 1

WITNESSES
INVENTOR
Cecil E. Godkin
ATTORNEYS

April 10, 1928.

C. E. GODKIN 1,665,662

ELECTROMAGNETIC DETECTING DEVICE

Filed Dec. 15, 1925      2 Sheets-Sheet 2

WITNESSES

INVENTOR
Cecil E. Godkin
BY
ATTORNEYS

Patented Apr. 10, 1928.

1,665,662

UNITED STATES PATENT OFFICE.

CECIL E. GODKIN, OF HAYWARD, CALIFORNIA.

ELECTROMAGNETIC DETECTING DEVICE.

Application filed December 15, 1925. Serial No. 75,599.

This invention relates to an electro-magnetic detecting device, and has for an object the provision of a simple, efficient, rugged apparatus for use in detecting oil.

Another object resides in the provision of a simple, compact apparatus which can be carried around from place to place without any particular trouble.

A further object resides in the provision of an apparatus which is highly sensitive, immune from the ordinary electro-magnetic disturbances, and provided with means whereby oil lying below the surface of the earth may be accurately detected and charted.

A still further object resides in the provision of an apparatus which when operated in a definite way will enable the operator readily to calculate the location of oil and to determine with a reasonable degree of accuracy the character of the oil thus located.

Another object resides in the particular construction and arrangement of parts which are hereinafter described and claimed and shown in the accompanying drawings.

The invention is illustrated in the drawings of which—

Figure 1:
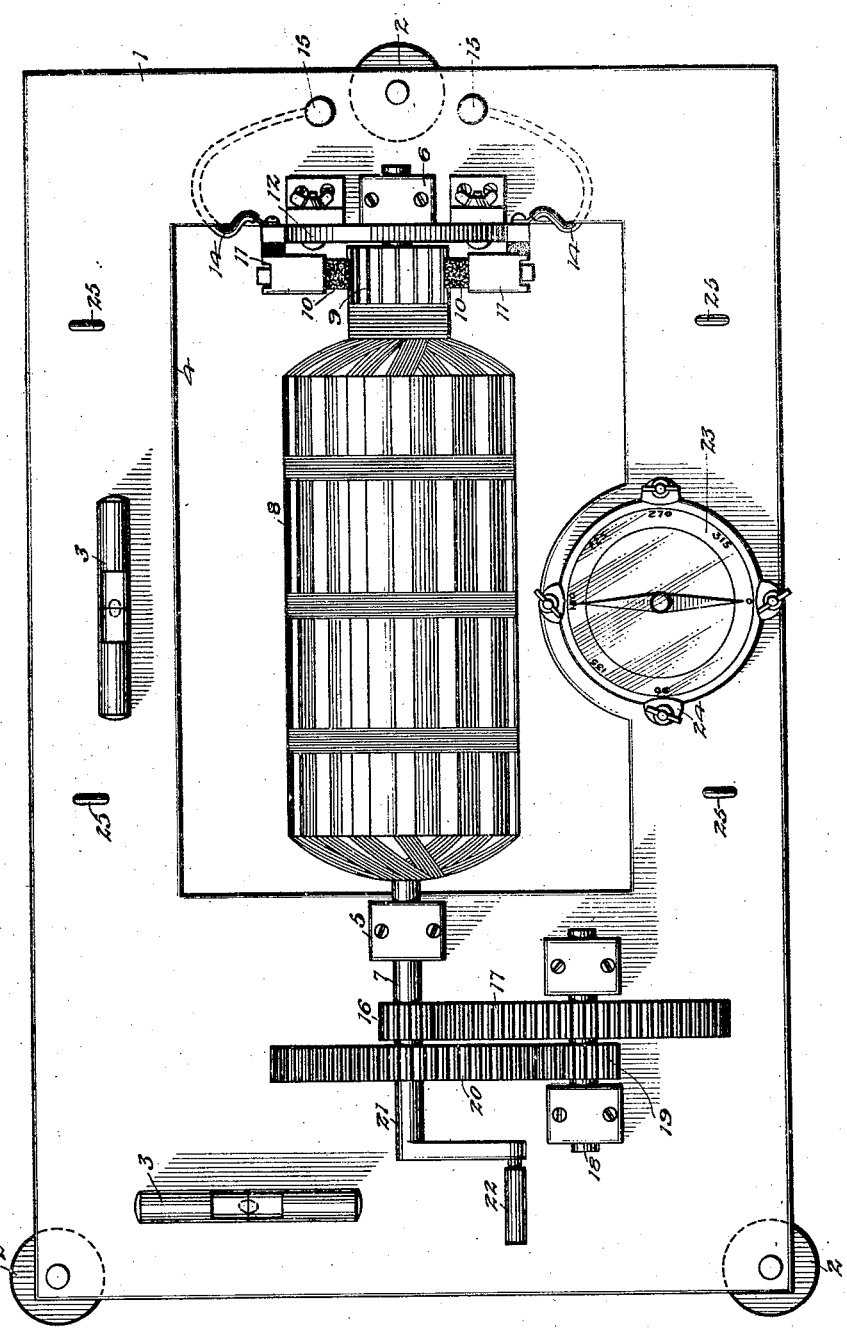
Figure 1 is a plan view of the detecting set with the cover removed.
Figure 2:
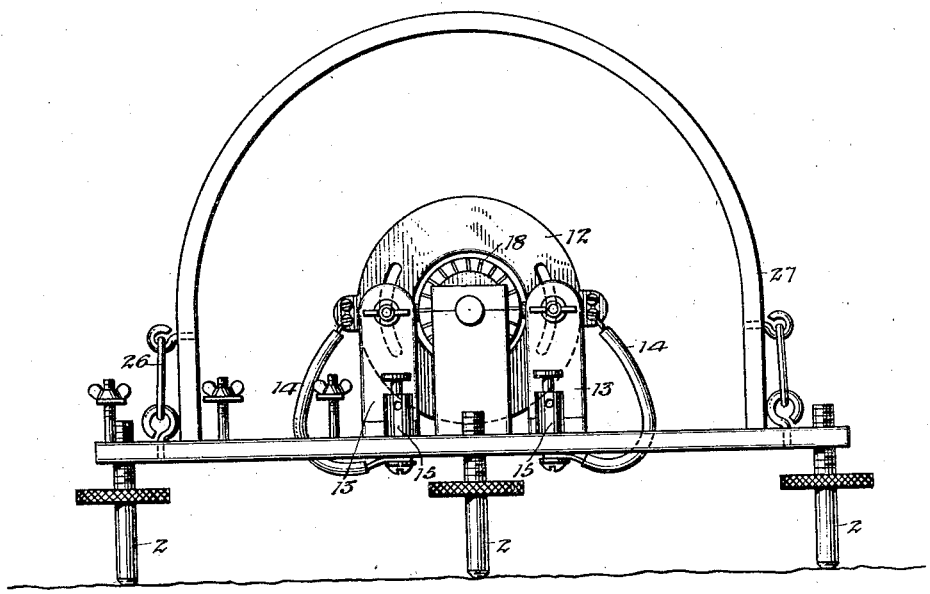
Fig. 2 is an end view of the apparatus showing the cover in place.

This machine comprises a current generating device mounted on a suitable platform and adapted to be driven by suitable gearing at any desired rate of speed. This generator or rotating element is intended to be mounted, preferably in a level position with its axis at right angles to the magnetic field of the earth at the particular point where the test is being carried out. The rotating element is provided with means such as a commutator to collect the current generated and is connected by suitable wires to a delicate indicating instrument, which may be a galvanometer or a potentiometer arrangement. Any suitable instruments, however, may be used, such as a millivoltmeter or a milliammeter, suitably calibrated in the desired units.

As shown in the figures, I have provided a table or base 1 provided with suitable levelling devices 2 and levelling indicating means, such as 3 so that this base may be disposed in a substantially horizontal plane. This base is provided, preferably, with a rear large opening 4 arranged approximately in the center, and over this opening 4 mounted rotatably on supports, such as 5 and 6, is a shaft 7 carrying an armature 8, preferably wound with many threads of insulated wire. The number of threads of wire used depends upon the sensitivity required of the armature. This armature 8 is connected to a commutator 9 against which brushes 10 bear. These brushes are mounted in carriers 11 supported on a rotatable plate 12 which in turn is supported on pedestals 13. Suitable wires, such as 14, lead from the brushes and connect to binding posts 15.

The other end of the shaft 7 is provided with a gear 16 meshing with a gear 17. This gear 17 is mounted on a shaft 18 carrying a small gear 19. The gear 19 meshes with a large gear 20 carried on a second shaft 21 to which a handle 22 is connected. When the handle 22 is rotated, it will be observed that the gearing will cause the shaft 7 to be rotated at high speed, the preferable ratio of gears causing a revolution of the armature shaft about twenty-five times to one revolution of the crank. Preferably the brush-supporting plate 12 is formed of any suitable fibrous or insulating material.

A magnetic compass 23 is mounted on the base 1 and held thereon by clamping plates 24 which can be moved to release the compass at will. The base is provided with a plurality of eyes 25 around the opening 4 to which hooks may be connected. These hooks are mounted on a cover 27. This cover is adapted to extend over the armature and is preferably of magnetic material so as to act as a magnetic shield for the space above and around the armature so that only the magnetic current reaching the armature through the opening 4 below, it will be affected in causing the deflection of current. This is for the purpose of eliminating the effect of stray disturbances through the air.

Figure 3:
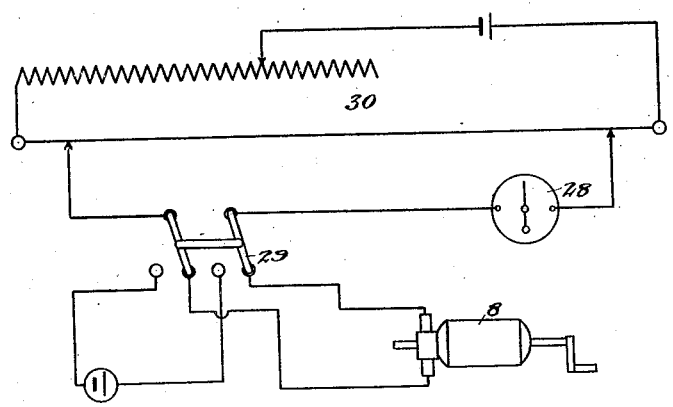
Fig. 3 is a representation of the preferred circuit diagram used in connection with this machine.

In the operation of the device, the platform or base 1 is disposed, preferably, in such position that the armature shaft extends at right angles to the meridian at that particular point. After this adjustment has been made the platform is leveled and then the compass is removed, after which the armature is placed in position, any suitable means (not shown) being provided to readily move the armature from the base. The magnetic cover may then be placed in position, the base 1 preferably being made of brass. With the armature being rotated at a definite speed, a deflection will be obtained on any suitable indicating instrument, such as a galvanometer 28. This deflection will be obtained when a switch 29 is in the position shown in Fig. 3 and connected to the armature. This switch and the galvanometer 28 shown are connected in circuit with a well-known form of potentiometer, represented by the numeral 30, so that very small potentials generated can be accurately measured.

It is possible to calibrate this instrument by operating in the vicinity of oil-wells of known capacity which are located at known depths. In this manner, operating at a definite speed, the reading for that particular oil well at any definite depth can be noted, also to check on this reading the armature may be revolved at a different speed and the deflection caused by the same oil well at this new speed may be noted. In addition as a check, another armature having a different number of windings may be be placed in position and rotated at the two given speeds to get readings for the effect of this given well on the instrument when the oil is located at the known distance. In this manner the effect of various oil deposits may be calibrated or the scale of the instrument so that the chart may be obtained of the effect of a large number of oil wells which will enable the operator very readily to determine whether oil is present, and if so, at what approximate depth it may be found and in what quantities.

What I claim is:

1. A device of the type described comprising a support, an armature carried by said support, means for adjusting said support with respect to the ground for disposing said support in a horizontal plane, a magnetic shield carried by said support and covering said armature, means for actuating said armature and a potentiometer in electric connection with said armature and a current measuring device in electric connection with said potentiometer and said armature.

2. A device of the type described comprising a frame, means carried by said frame for supporting it in horizontal position with respect to the ground and an armature carried by said frame, means for actuating said armature, a magnetic shield covering the upper portion of said armature and being carried by said frame and a current measuring device in electric connection with said armature.

CECIL E. GODKIN